United States Patent
Becker et al.

(10) Patent No.: US 8,672,625 B2
(45) Date of Patent: Mar. 18, 2014

(54) WIND TURBINE WITH MONITORING SENSORS

(75) Inventors: Edwin Becker, Reken (DE); Marcel Kenzler, Koenigs Wusterhausen (DE); Johann Loesl, Buch am Erlbach (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 912 days.

(21) Appl. No.: 12/706,082

(22) Filed: Feb. 16, 2010

(65) Prior Publication Data

US 2010/0209247 A1 Aug. 19, 2010

(30) Foreign Application Priority Data

Feb. 16, 2009 (DE) .......... 10 2009 009 039

(51) Int. Cl.
F03D 7/04 (2006.01)
F03D 1/06 (2006.01)

(52) U.S. Cl.
USPC .............. 416/1; 416/61; 416/80; 416/145

(58) Field of Classification Search
USPC ...... 416/1, 61, 79, 80, 82, 132 B, 132 R, 144, 416/145, 153, 6, 31, 169 R, 44, 55
See application file for complete search history.

(56) References Cited

U.S. PATENT DOCUMENTS

| | | | |
|---|---|---|---|
| 6,619,918 B1 * | 9/2003 | Rebsdorf | 416/1 |
| 6,850,821 B2 * | 2/2005 | Weitkamp | 700/286 |
| 6,940,186 B2 * | 9/2005 | Weitkamp | 290/44 |
| 7,246,991 B2 | 7/2007 | Bosche | |
| 7,348,683 B2 * | 3/2008 | Riesberg | 290/1 R |
| 7,351,033 B2 | 4/2008 | McNerney | |
| 7,822,560 B2 | 10/2010 | LeMieux | |
| 2004/0057828 A1 * | 3/2004 | Bosche | 416/1 |
| 2006/0140761 A1 * | 6/2006 | LeMieux | 416/61 |
| 2007/0297892 A1 | 12/2007 | Kildegaard | |
| 2008/0067814 A1 | 3/2008 | Volkmer | |
| 2008/0152493 A1 * | 6/2008 | Sundermann et al. | 416/41 |
| 2008/0206052 A1 | 8/2008 | Volkmer | |
| 2009/0039650 A1 * | 2/2009 | Nies | 290/44 |
| 2009/0243295 A1 * | 10/2009 | Kammer et al. | 290/44 |
| 2009/0319199 A1 | 12/2009 | Volkmer | |
| 2011/0029276 A1 * | 2/2011 | Cabral Martin | 702/141 |

FOREIGN PATENT DOCUMENTS

| | | |
|---|---|---|
| DE | 102 19 664 A1 | 11/2003 |
| DE | 10 2004 014 992 A1 | 10/2005 |
| GB | 2 310 912 A | 9/1997 |
| WO | 02/084114 A1 | 10/2002 |
| WO | 2008/058876 A2 | 5/2008 |
| WO | 2008/092461 A2 | 8/2008 |
| WO | 2008/148370 A2 | 12/2008 |

* cited by examiner

*Primary Examiner* — Nathaniel Wiehe
*Assistant Examiner* — Aaron Jagoda
(74) *Attorney, Agent, or Firm* — Roberts Mlotkowski Safran & Cole, P.C.; David S. Safran

(57) ABSTRACT

A vibration-resistant wind turbine and process for operation is provided. The wind turbine has a rotor with at least two blades, each of which includes an inclinometer arrangement with at least two axes, and an evaluating unit. The evaluating unit determines the bending and/or twisting of the blade relative to the longitudinal axis of the blade on the basis of signals from the inclinometer arrangement for each blade during operation. Each rotor blade further has at least one liquid tank which is capable of receiving or transferring liquid from or to a liquid reservoir via a transfer mechanism in response to the determined bending and/or twisting of the rotor blades to reduce vibration caused by imbalances, thereby extending the service life of the wind turbine.

13 Claims, 2 Drawing Sheets

WIND TURBINE WITH MONITORING SENSORS

BACKGROUND OF THE INVENTION

1. Field of the Invention

This invention generally relates to a vibration-resistant wind turbine, and is specifically concerned with a wind turbine having a rotor with at least two blades, each of which includes an inclinometer arrangement with at least two axes, and a process of operation.

2. Description of Related Art

Wind turbines typically comprise a rotor—with a hub and three rotor blades—that is mounted in horizontal orientation in an engine housing. The housing accommodates a rotor-driven generator and is mounted to rotate on a tower. In general, the rotor blades are mounted in an adjustable manner on the rotor hub to control the angle of attack of each individual rotor blade separately. In current research, it is even considered to also adjust parts of the rotor blade separately. By such an adjustment of the angle of attack (also referred to as pitch angle), the speed of the rotor can be regulated.

Wind turbines are basically subject to vibration, in particular because of the rotor being out of balance. The imbalances that occur are due primarily to either mass imbalances or aerodynamic imbalances. Mass imbalances may arise because of unequal rotor blade masses or unequal mass distributions in the individual rotor blade, hub imbalances, eccentricities of the complete rotor, icing on the rotor blades, or water penetration inside the rotor blades. Aerodynamic imbalances may arise because of blade angle errors, unequal rotor blade profile shapes, rotor blade damage, oblique inflow of the rotor, as well as site-based excitations from outside, (e.g., by tower resonance and the fact that the wind speed generally depends on the height above ground such that one and the same rotor blade is exposed to different aerodynamic forces, depending on whether it is just below or above). Such imbalances result in a reduced service life of the wind turbine. Minimization of the imbalances of the rotor is therefore desirable. Also, a diagnosis of the operating state of the wind turbine is advantageous in order to shut down the wind turbine for safety reasons when unacceptable stresses occur or to determine defective components and to exchange them in a timely fashion.

A survey on the vibration problem in wind turbines can be found in, for example, the magazine telediagnose.com, Edition No. 12.

Described in German Patent Application DE 102 19 664 A1 and corresponding U.S. Pat. No. 6,940,186 is a wind turbine in which sensor elements are provided for determining mechanical stresses of the rotor on the rotor blades and on the rotor shaft in order to adjust the rotor blades based on the mechanical stresses that are determined. The sensors that are provided on the rotor shaft are used to detect pitch and yaw moments. Also, the rotor blades can be provided with ballast tanks in order to pump water from a storage tank provided in the hub into the ballast tanks or to drain water from the ballast tanks into the storage tank in order to minimize possible rotor imbalance by trimming. While the filling of the ballast tanks is possible even during operation, the rotor in the corresponding position has to be shut down when draining a ballast tank.

From German Patent Application DE 10 2004 014 992 A1, a wind turbine is known in which an imbalance sensor is provided to determine the imbalance of the rotor, and the rotor blades are provided with balance weights that can be adjusted in axial direction and that can be adjusted corresponding to the determined imbalance in order to minimize the imbalance of the rotor.

In general, European Patent Application EP 1 674 724 A2 and corresponding U.S. Publication No. 2006/0140761 describes the monitoring of components of a wind turbine by means of various sensors, for example acceleration sensors, gyroscopes, proximity sensors, and inclinometers, and, in reference to the monitoring of rotor blades, the use of proximity sensors—by means of which the bending of the blades is to be detected—is described.

International Patent Application Publication WO 01/33075 A1 and corresponding U.S. Pat. No. 6,619,918 describes the load-sensing equipment of strain gauges attached to the rotor blades of a wind turbine for the purpose of controlling the pitch adjustment of the blades.

International Patent Application Publication WO 2006/012827 A1 and corresponding U.S. Publication No. 2008/0206052 describes the monitoring of the state of the rotor blades of a wind turbine during operation by means of solid-borne sound conduction, whereby movement sensors are arranged on the blades.

International Patent Application Publication WO 2006/039903 A1 and corresponding U.S. Patent Publication No. 2008/0067814 describes a pitch adjustment of the rotor blades of a wind turbine implemented by monitoring the pressure difference between the front side of the blade and the back side of the blade.

International Patent Application Publication WO 2007/131489 A1 and corresponding U.S. Publication No. 2009/031199 describes the use of acceleration sensors on the rotor blades of a wind turbine for the purpose of regulating the pitch angle, whereby vibration measurements are made.

International Patent Application Publication WO 2008/058876 A2 describes that for the purpose of preventing rotor blades from colliding with the tower of a wind turbine, distance sensors can be arranged on the tower or on the housing in order to measure the distance from the respective rotor blade to a prescribed location of the wind turbine and optionally to emit a collision warning.

International Patent Application Publication WO 2005/068834 A1 and corresponding U.S. Publication No. 2007/0297892 relates to a wind turbine in which the state of the rotor blade is monitored by means of strain gauges, and the position of the rotor blade is monitored by means of GPS.

The monitoring of the state of the rotor blades by means of strain gauges is problematic in as much as strain gauges are difficult to install and are relatively short-lived. Furthermore, strain gauges measure, in principle, only locally in the structure of the rotor blade. This shortcoming also applies to acceleration sensors or movement sensors.

SUMMARY OF THE INVENTION

A primary object of this invention is to implement a state-monitoring of the rotor blades of a wind turbine as reliably as possible.

This object is achieved by providing each rotor blade of a wind turbine with at least one inclinometer arrangement that has at least two axes, in combination with an evaluating unit in communication with the at least one inclinometer arrangement. The evaluation unit determines the bending and/or twisting of the blade relative to the longitudinal axis of the blade, thus making possible a reliable evaluation of the state relative to the operationally induced deformations of the rotor blades. It is especially advantageous that by means of inclinometers, reference to the direction of rotation or to the geocenter is produced, i.e., an absolute frame of reference is predetermined by which the accuracy of the measurement of the deformation of the rotor blade can be achieved. Furthermore, the pitch adjustment of the rotor blades can also be monitored by means of the inclinometer arrangement.

The invention further includes a process for operating a wind turbine with a rotor with at least two blades that in each case are provided with at least one inclinometer arrangement with at least two axes. In this process, a when a change in the inclination of the inclinometer arrangement is detected for a blade, the bending and/or the twisting of the blade relative to the longitudinal axis of the blade is determined.

Below, the invention is explained in more detail by way of example with reference to the accompanying drawings.

DETAILED DESCRIPTION OF THE INVENTION

Figure 1:
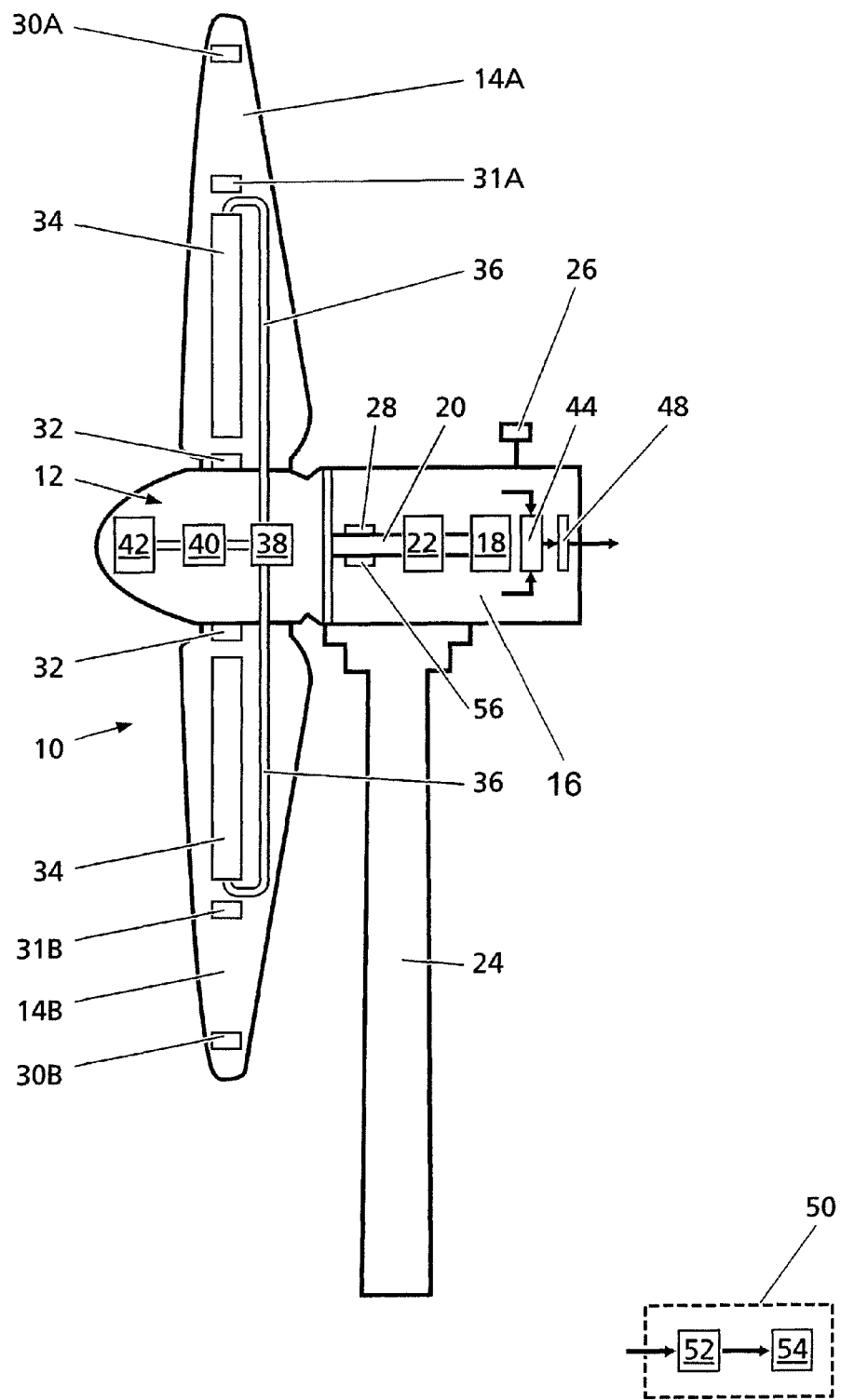
FIG. 1 is a diagrammatic example of a wind turbine according to the invention.
Figure 2:
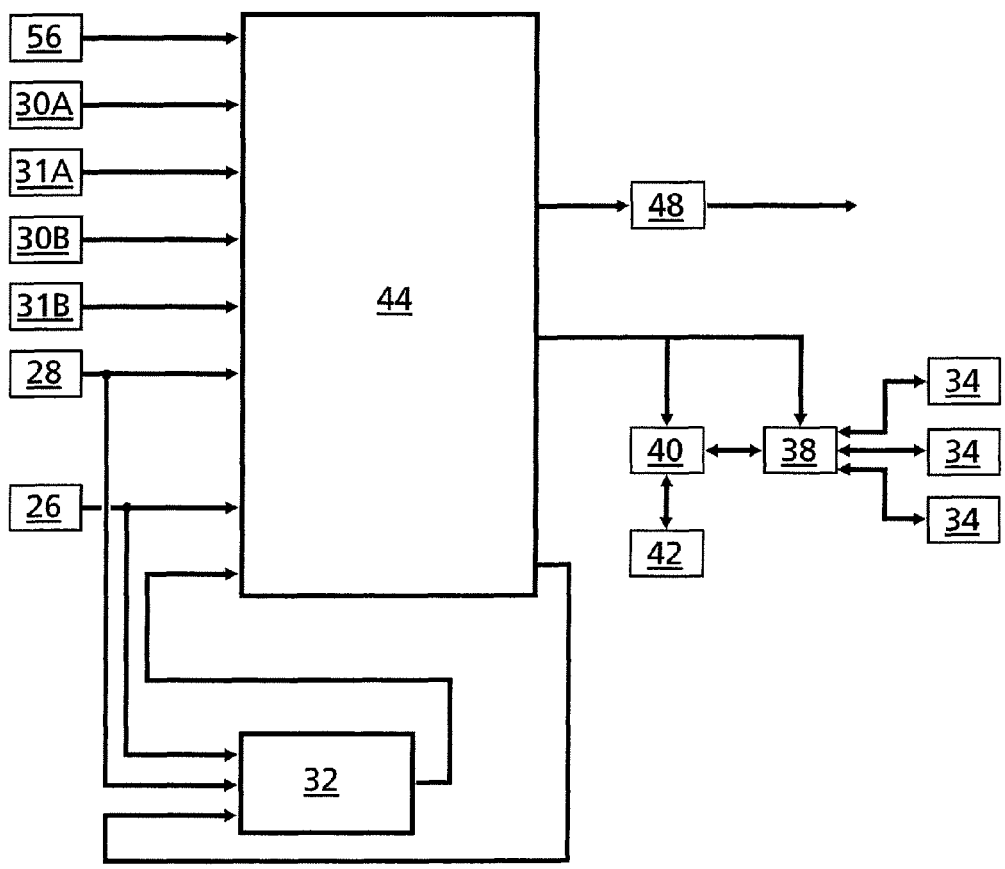
FIG. 2 is a block diagram of the essential components of the wind turbine of FIG. 1.

FIG. 1 shows a diagrammatic example of a wind turbine according to the invention. In this case, a rotor 10 is provided with a hub 12 for three rotor blades (of which only two rotor blades 14A, 14B are shown in FIG. 1). The rotor 10 is mounted in horizontal orientation in a nacelle 16, which accommodates a generator 18 that is driven by the rotor shaft 20 via a drive 22. The nacelle 16 is mounted on a tower 24 to rotate around a vertical axis. The housing also has a sensor 26 for the wind speed and the wind direction. In addition, a sensor 28 is provided for the detection of the speed of the rotor 10.

In each rotor blade 14A, 14B, at least one inclinometer arrangement that has at least two axes is provided (in the example, two inclinometer arrangements 30A, 31A or 30B, 31B that are offset on each rotor blade in the longitudinal direction of the blade are shown). The inclinometer arrangements are provided in order to determine the bending and/or twisting of the blade relative to the longitudinal axis of the blade for each rotor blade during operation. The bending of the rotor blade relative to the longitudinal axis of the blade can be determined when the inclinometer arrangement is arranged such that it can detect a change in the inclination of the inclinometer arrangement relative to a plane that is perpendicular to the longitudinal axis of the blade (in the case of a two-axis inclinometer, this corresponds to the plane that is formed by the two-axis inclinometer). Twisting of the rotor blade relative to the longitudinal axis of the blade can be detected when the inclinometer arrangement is arranged such that it can detect a movement of the inclinometer around the longitudinal axis of the rotor blade (in this case, the corresponding axis of the inclinometer has to be parallel to the longitudinal axis of the rotor blade).

The rotor blades 14A, 14B can be adjusted in each case by means of a pitch controller 32 around their longitudinal axis relative to the hub 12 in order to implement a pitch adjustment of the rotor blades 14A, 14B in the usual way. In this case, preferably each rotor blade 14A, 14B is adjusted individually.

In each rotor blade 14A, 14B, at least one liquid tank 34 is provided that is connected via lines 36 to a distributor arrangement 38. The distributor arrangement 38 is connected to a pump 40 that in turn is connected to a liquid reservoir 42. The distributor arrangement 38, the pump 40, and the liquid reservoir 42 are arranged in a fixed manner in the hub 12 relative to the hub 12 and rotate correspondingly when the rotor 10 is in operation. Also, a unit 44 is provided in order to control the pump 40 or the distributor arrangement 38. The liquid can be, for example, water, optionally with the addition of antifreeze, e.g., glycol.

The signals from the speed sensor 28, the wind gauge 26, and the inclinometer arrangements 30A, 31A, 30B, 31B are directed into the data-processing unit 44. In the data-processing unit 44, the bending and/or rotation of the blade relative to the longitudinal axis of the blade is determined from the signals from the inclinometer arrangements for each blade, from which then conclusions are drawn on a mass imbalance and an aerodynamic imbalance of the respective rotor blade. On the one hand, the signals from the inclinometer arrangements that are processed or evaluated in this way can be used as criteria for a rapid shut-down of the wind turbine when preset boundary values are exceeded. The evaluation of the signals from the inclinometer arrangements can be implemented by means of time range averaging, frequency analysis, classification, and/or event monitoring, whereby the classification can be implemented by means of a rainflow-counting algorithm.

The evaluated data or else the signals from the inclinometer arrangements in the original form or in a pre-processed intermediate form can be forwarded online via a data transfer device 48 to a diagnostic site 50 that is arranged removed from the wind turbine 10 in order to evaluate the state of the wind turbine. In this case, the data transfer preferably is implemented by Internet and can be actively requested, for example, by the diagnostic site 50 or automatically implemented at certain intervals by e-mail. The diagnostic site 50 comprises a data-processing unit 52 for processing the received data as well as a display device 54 for displaying the processed data.

The unit 44 also preferably has an input for the pitch controller 32 and an input for the wind sensor 26. From the rotor imbalance or blade deformations determined by means of the signals from the inclinometer arrangements, optionally taking into consideration the pitch controller 32 and the signals from the wind sensor 26, the control device 44 produces a control signal for the liquid transfer mechanism formed by the pump 40 and the distributor 38 in order to selectively transfer liquid between the liquid reservoir 42 and the liquid tank 34 based on the imbalance that is detected in order to continuously minimize the imbalance of the rotor 10.

As input signals, the pitch controller 32 takes into consideration, i.a., the signals from the wind sensor 26 and the speed sensor 28 as well as an output signal from the control unit 44, this being representative of the detected rotor imbalance or deformation of the respective blade. In this way, the pitch controller 32 uses the speed regulation and can in addition assist in the compensation of imbalances of the rotor 10. In this case, a smoothing of the dynamics of the pitch is made possible by the described recycling of liquid into or from the tanks 34.

The power supply of the rotating pump 40 is implemented preferably via a slip ring (not shown).

In the configuration of the tank 34 that is shown in FIG. 1, the supply/discharge lines 36 are connected respectively to the end of the tank 34 that is far from the rotor hub 12, by which in the rotating rotor 10, not only the possibility of the liquid supply to the tanks 34, but also the possibility of the liquid discharge from the tanks 34 is ensured at all times since because of the centrifugal force, liquid is always available at the end of the tank 34 that is far from the rotor hub 12, even if the tank 34 contains only a little liquid and if there is air in the system. In principle, in such a configuration of the tank 34, it can be designed with rigid walls or like a bag with flexible walls.

In principle, a single tank 34 or else several such tanks can be provided per rotor blade 14A, 14B. Also, instead of a single storage reservoir 42, a multiple of such reservoirs can be provided. Also, instead of a pump 40 that is provided in common for all tanks 34, for example for each of the rotor blades 14A, 14B or for each of the tanks 34, a separate liquid pump can be provided. Instead of as a block as shown in FIG. 1, the distributor arrangement 38 can be implemented, i.e., as a three-way valve, even by separately controlled valves in each of the supply/discharge lines 36.

The signals from the inclinometer arrangements can also be used in order to monitor the pitch controller 32. Conversely, as already mentioned, the signals from the inclinometer arrangements can be taken into consideration in the control of the pitch controller 32.

In the main bearing of the hub (not shown), an imbalance sensor can also be provided in the form of a vibration sensor 56 in order to detect an imbalance of the rotor 10 during operation. The signals from the imbalance sensor 56 are also fed into the data processing unit 44 and can be taken into consideration in the diagnosis of the wind turbine as well as in the control of the pitch 32 or the control of the liquid pump 40.

What is claimed is:

1. Wind turbine comprising:
    a rotor with at least two blades, each of which is provided with at least one inclinometer arrangement with at least two axes, and
    an evaluating unit in communication with the at least one inclinometer arrangement of each blade and that determines at least one of bending and twisting of the blades relative to a longitudinal axis of the blade from signals transmitted by the at least one inclinometer arrangement of each blade during operation;
        wherein each of the rotor blades has at least one liquid tank and at least one liquid reservoir, and further comprising a liquid transfer mechanism which transfers liquid between the at least one liquid reservoir and the at least one liquid tank in response to determined imbalance of the rotor detected during rotation of the rotor, the transfer mechanism being operative for transferring liquid from at least one tank during rotation in a manner acting to continuously minimize the imbalance determined.

2. Wind turbine according to claim 1, wherein each blade is provided with several inclinometer arrangements that are arranged offset in a direction of the longitudinal axis of the blade for measurement of bending and twisting of the blades.

3. Wind turbine according to claim 1, wherein each of the rotor blades has a pitch controller which adjusts the pitch of said blades in response to determined bending of the rotor blades during rotation of the rotating rotor.

4. Wind turbine according to claim 1, wherein supply/discharge lines run from said reservoir to an end of the at least one liquid tank of each blade that is directed away from the rotor hub for enabling liquid discharge from the tanks at all times because of centrifugal force.

5. Process for operating a wind turbine with a rotor with at least two blades, each of which is provided with at least one inclinometer arrangement with at least two axes, comprising the steps of:
    detecting a change in the inclination of the at least one inclinometer arrangement, and
    determining at least one of bending and rotation of each blade relative to a longitudinal axis of the blade from the change of inclination of the at least one inclinometer arrangement that is detected;
    wherein each of the rotor blades has at least one liquid tank and at least one liquid reservoir, and wherein the rotor further includes a liquid transfer mechanism, further comprising the step of using the transfer mechanism for transferring liquid between the at least one liquid reservoir and the at least one liquid tank in response to a determined imbalance of the rotor of the rotor blades during rotation of the rotor, the liquid being transferred during rotation from at least one of the liquid tanks in a manner acting to continuously minimize the imbalance determined.

6. Process according to claim 5, further comprising the step of using at least one of time range averaging, frequency analysis, classification, and event monitoring to evaluate signals from the inclinometer arrangements.

7. Process according to claim 5, comprising the further step of using classification implemented by means of a rainflow-counting algorithm to evaluate signals from the inclinometer arrangements.

8. Process according to claim 5, comprising the further step of controlling an angle of attack of each rotor blade from signals from the inclinometer arrangements.

9. Process according to claim 5, comprising the further step of determining a mass imbalance and an aerodynamic imbalance of the rotor blades from signals from the inclinometer arrangements.

10. Process according to claim 5, comprising the further step of rapidly shutting-down the wind turbine as a result of the signals from the inclinometer arrangements.

11. Process according to claim 5, comprising the further step of transferring data obtained by means of the inclinometer arrangements to a diagnostic site that is remote from the wind turbine to evaluate an operating state of the wind turbine.

12. Process according to claim 11, wherein the data transferring step is implemented by Internet subsequent to a preliminary processing of the data.

13. Process according to claim 5, wherein each blade is provided with several inclinometer arrangements that are arranged offset in a direction of the longitudinal axis of the blade and wherein both bending and twisting of the blades is determined from the change of inclination of the inclinometer arrangements that is detected.

* * * * *